United States Patent [19]

Yamanaka et al.

[11] 4,411,497

[45] Oct. 25, 1983

[54] ELECTROCHROMIC DISPLAY ELEMENT

[75] Inventors: Kazusuke Yamanaka, Shiroyama; Shouji Mochizuki, Hachioji, both of Japan

[73] Assignee: Hitachi, Ltd., Tokyo, Japan

[21] Appl. No.: 233,469

[22] Filed: Feb. 11, 1981

[30] Foreign Application Priority Data

Feb. 26, 1980 [JP] Japan .............................. 55-23077[U]

[51] Int. Cl.³ .............................................. G02F 1/17
[52] U.S. Cl. .................................................. 350/357
[58] Field of Search ...................... 350/357; 252/408; 29/570

[56] References Cited

U.S. PATENT DOCUMENTS 4,348,077 9/1982 Kondo et al. ..................... 350/357

Primary Examiner—James W. Davie
Attorney, Agent, or Firm—Antonelli, Terry & Wands

[57] ABSTRACT

Disclosed is an electrochromic display element having a counter electrode comprised of a sintered material prepared by sintering an atomized material comprising as main components a powder of $Sn[Fe(CN)_6]$, $MnK[Fe(CN)_6]$, $NiK[Fe(CN)_6]$, amorphous $Fe_2(WO_4)_3$, amorphous $FeWO_4$, amorphous $Mn_2(WO_4)_3$ or amorphous $MnWO_4$ and a powder of carbon. This electrochromic display element is characterized in that no substantial non-uniform brightness is observed among colored segments.

24 Claims, 2 Drawing Figures

ELECTROCHROMIC DISPLAY ELEMENT

BACKGROUND OF THE INVENTION

The present invention relates to an electrochromic display element comprising as an electrochromic material a transition metal oxide such as tungsten oxide. More particularly, the present invention relates to an improvement in a counter electrode in such electrochromic display element.

An electrochromic display element ordinarily has a structure as shown in the sectional view of FIG. 1. In FIG. 1, referential numeral 1 represents a front glass substrate, reference numeral 2 represents a transparent conductive layer comprised of $In_2O_3$-$SnO_2$, $SnO_2$ or the like, and reference numeral 3 represents an electrochromic material comprised of a transition metal oxide such as $WO_3$, $MoO_3$ or $V_2O_5$. Reference numeral 4 represents a passivation film for the transparent conductive layer 2 and the film 4 is comprised of SiO, $SiO_2$ or the like. Reference numeral 5 represents a liquid electrolyte comprised of a solution of a lithium salt in an organic compound as a solvent, such as a propylene carbonate solution of $LiClO_4$. Reference numerals 6 and 7 represent a counter electrode and a back glass substrate, respectively. A reflecting material such as a white powder of titanium oxide is incorporated in the liquid electrolyte 5. Reference numerals 9 and 10 represent a conductor and a gasket, respectively. A filmy conductor is illustrated as the conductor 9 in the drawings, but it may be a meshlike wire conductor.

As the counter electrode in such conventional electrochromic display element, there has broadly been used a counter electrode of $Li_xWO_3$ prepared by forming a tungsten oxide film on a transparent electrode on the back glass substrate and injecting Li ions into this tungsten oxide film prior to formation of a cell. This counter electrode, however, has the following defects.

If a segment having a display electrode is colored, Li is dissolved in the liquid electrolyte in the counter electrode, and the electrode of $Li_xWO_3$ is changed to $Li_{x-\delta}WO_3(\delta>0)$ by this coloration. If the other segment is then colored, the electrode is changed to $Li_{x-\delta-\delta'}WO_3(\delta'>0)$. In this case, a common electrode is used for the counter electrode. As is seen from the electrochemical consideration, the potential of the counter electrode depends on the Li content in the electrode. Accordingly, if the constant potential driving method, which is a preferred driving method, is adopted, the potential substantially applied to the display electrode is changed depending on whether the composition of the counter electrode is $Li_xWO_3$, $Li_{x-\delta}WO_3$ or $Li_{x-\delta-\delta'}WO_3$. This causes a non-uniform brightness among colored segments and this phenomenon is not desired.

As means for eliminating such non-uniform brightness, there may be considered a method in which the thickness of $Li_xWO_3$ of the counter electrode is increased so that the value of $\delta$ or $\delta'$ is relatively reduced. However, increase of the thickness of $Li_xWO_3$ results in increase of the resistance of the $Li_xWO_3$ layer, and another defect of reduction of the response speed is brought about. From the practical viewpoint, use of a layer of $Li_xWO_3$ having a thickness exceeding 5000 Å is not permissible.

The following references are cited to show the state of the art:

(i) Japanese Patent Application Laid-Open Specification No. 8983/72
(ii) Japanese Patent Application Laid-Open Specification No. 13891/72
(iii) Specification of U.S. Pat. No. 3,982,472

SUMMARY OF THE INVENTION

It is a primary object of the present invention to provide an improved electrochromic display element in which the above-mentioned defects of the conventional electrochromic display element are eliminated.

In the electrochromic display element of the present invention, in order to attain the above object, a sintered material of an atomized material which comprises a powder of one compound (hereinafter referred to as "active substance") selected from the group consisting of $Sn[Fe(CN)_6]$, $MnK[Fe(CN)_6]$, $NiK[Fe(CN)_6]$, amorphous $Fe_2(WO_4)_3$, amorphous $FeWO_4$, amorphous $MnWO_4$ and amorphous $Mn_2(WO_4)_3$ and a carbon powder, optionally together with a binder, is used as the counter electrode.

DETAILED DESCRIPTION OF THE INVENTION

Figure 1:
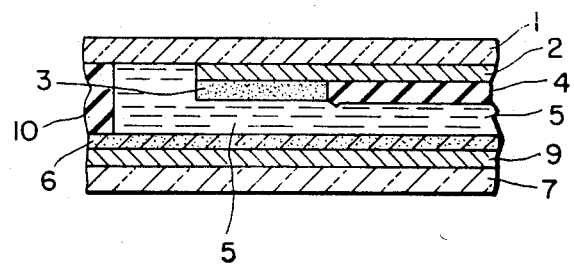
FIG. 1 is a sectional view showing the structure of an electrochromic display element.

The above-mentioned $Sn[Fe(CN)_6]$ is a water-insoluble tin complex, the above-mentioned $MnK[Fe(CN)_6]$ is a water-insoluble manganese complex, and the above-mentioned $NiK[Fe(CN)_6]$ is a water-insoluble nickel complex. The above-mentioned amorphous $Fe_2(WO_4)_3$ and $FeWO_4$ can be synthesized by mixing an aqueous solution of a water-soluble tungstate with an aqueous solution of a water-soluble iron salt and the above-mentioned amorphous $MnWO_4$ and $Mn_2(WO_4)_3$ can be synthesized by mixing an aqueous solution of a water-soluble tungstate with an aqueous solution of a water-soluble manganese salt, and each of these tungstates is obtained in the form of an amorphous, water-insoluble powder. The above-mentioned tin complex, manganese complex and nickel complex are ordinarily obtained in the crystalline state, and they can be directly used as the constituent material of the counter electrode. However, each of the above-mentioned iron tungstates [$Fe_2(WO_4)_3$ and $FeWO_4$] and manganese tungstates [$Mn_2(WO_4)_3$ and $MnWO_4$] can be used as the constituent material of the counter electrode only when it is amorphous. Crystalline iron tungstates and manganese tungstates are not suitable as the constituent material of the counter electrode because the electric conductivity is low. Each of the foregoing compounds used as the constituent material of the counter electrode is a water-insoluble salt.

The above-mentioned water-insoluble tin complex can be synthesized, for example, by mixing an aqueous solution of potassium ferricyanide or potassium ferrocyanide with an aqueous solution of stannous chloride or stannic chloride (combination of stanic chloride with potassium ferricyanide is excluded), the above-mentioned water-insoluble manganese complex can be synthesized by mixing an aqueous solution of potassium ferricyanide or potassium ferrocyanide with an aqueous solution of manganese chloride (combination of manganous chloride with potassium ferrocyanide is excluded), and the water-insoluble nickel complex can be synthesized by mixing an aqueous solution of potassium ferricyanide with an aqueous solution of a water-soluble divalent nickel salt such as nickel sulfate or nickel chloride. The water-insoluble iron tungstate can be synthesized by mixing an aqueous solution of a water-soluble tungstate such as potassium tungstate or sodium tungstate with an aqueous solution of a water-soluble iron salt such as ferrous chloride, ferric chloride, ferrous sulfate, ferrous nitrate or ferric nitrate, and the water-insoluble manganese tungstate can be synthesized by mixing an aqueous solution of a water-soluble tungstate such as potassium tungstate or sodium tungstate with an aqueous solution of a water-soluble manganese salt such as manganese sulfate of manganese chloride.

In each of the aqueous solutions to be mixed, the concentration of the solute is not particularly critical, but if the concentration of the solute is too low, the efficiency of formation of the intended compound is reduced. Accordingly, it is practically preferred that the concentration of the solute be at least 0.01 mol/l and especially at high as possible. Furthermore, in order to prevent the undissolved solute from being incorporated into the synthesized compound, the amount of the solute to be added to water should be less than the amount corresponding to the solubility in water. In the synthesis of the foregoing compounds, the mixing ratio of the aqueous solutions is not particularly critical, but it is practically preferred that the aqueous solutions be mixed at a stoichiometric molar ratio, because the efficiency of formation of the intended compound is enhanced.

Among the foregoing compounds, iron tungstate is especially preferred because it is excellent in various characteristics and it can be synthesized very easily.

Incidentally, the substance represented by the formula $Fe_2(WO_4)_3$ includes not only $Fe_2(WO_4)_x$ in which x is exactly 3 but also $Fe_2(WO_4)_x$ in which x is slightly smaller than 3, for example, 2.7 or 2.6 (x is in the range of $3 > x > 2.5$). Accordingly, in the instant specification, $Fe_2(WO_4)_{2.7}$ and the like are included in $Fe_2(WO_4)_3$.

As the carbon to be atomized with the active substance, there may be used a commercially available aqueous solution of colloidal carbon (having a carbon concentration of 20% by weight). The carbon concentration in the aqueous solution is not limited to 20% by weight and an atomizable concentration may be adopted. An appropriate carbon concentration may be decided by a simple experiment. Carbon in this aqueous solution is in the form of fine particles.

At the atomizing step, the ratio of the water-insoluble salt powder, that is, the active substance, to fine particles of carbon is preferably such that the amount of the insoluble salt is larger than the amount of the fine particles of carbon, so far as drastic reduction of the electric conductivity of the sintered body is not caused. More specifically, it is practically preferred that the weight ratio of the amount of the insoluble salt powder to the amount of the fine particles of carbon be from 1/20 to 1/0.3, especially about ½. At the atomizing step, a binder such as an aqueous solution of polyvinyl alcohol (PVA) may be added, whereby bonding between the insoluble salt powder and the fine particles of carbon is effectively enhanced. It is preferred that the amount added of the binder as PVA be about 0.5 to about 1% by weight based on the insoluble salt. The concentration of PVA in the aqueous solution is adjusted below about 2% by weight. It is preferred that the concentration of PVA be adjusted so that a viscosity suitable for the subsequent coating operation is attained. Ordinarily, an aqueous solution having a PVA concentration of about 1% by weight is preferred because this solution is easy to handle. If the concentration is too low, the subsequent coating operation becomes difficult. An appropriate concentration easily be determined by a simple experiment.

The atomized material comprised of the active substance such as $Fe_2(WO_4)_3$ and the carbon powder may also be prepared by adding the active substance powder to a mixture of the carbon powder and a liquid polymer binder, further adding an organic solvent in an amount enough to facilitate atomization and atomizing the resulting mixture.

The atomized material is coated on a conductive layer formed on the back glass substrate of the electrochromic display element on the surface confronting the electrochromic material and is then sintered to form a sintered material.

The sintering temperature has no substantial influences on the characteristics, and therefore, there may be adopted a temperature causing sufficient dehydration and hardening of the binder, and when the binder is not contained or the binder used is hardened at normal temperatures, the sintering may be accomplished by moisture-removing drying at normal temperatures in air. In the case where the sintering is carried out under heating, if the above-mentioned complex is used, since a temperature exceeding 300° C. causes decomposition of the complex, the sintering should be conducted at a temperature lower than 300° C., and a sintering temperature of 100° to 250° C. is preferred from the industrial viewpoint. When the water-insoluble salt prepared by using the tungstate is employed, a sintering temperature of 100° to 500° C. is preferred from the industrial viewpoint. Furthermore, when the polymer binder is used, a sintering temperature higher than the hardening temperature of the polymer binder but lower than the decomposition temperature of the active substance is suitably used.

The sintering treatment is carried out for a time sufficient to dry the atomixed material at the sintering temperature adopted and harden the binder if the binder is used, though an appropriate sintering time varies depending on the sintering temperature, the absence or presence of the binder or the kind of the binder. For example, when no binder is added or when PVA or a one-component type epoxy binder is used as the binder, if the heat treatment is carried out in air at 200° C. for about 30 minutes, sufficient sintering is accomplished.

A larger thickness is preferred for the sintered material in the present invention, so far as cracks are not formed at the sintering step. From the practical viewpoint, it is preferred that the thickness of the sintered material be 5 to 1000 μm, especially about 50 to about 100 μm. Since the sintered material used for the counter electrode in the electrochromic display element of the present invention contains a large amount of carbon, the specific resistance is low, and therefore, even if the thickness is large as pointed out above, disadvantages encountered in the conventional technique using $WO_3$ are not brought about at all in the present invention.

Before the so obtained sintered material is assembled as the counter electrode of the electrochromic display element, Li ions may be injected into this sintered material by using an liquid electrolyte comprised of a propylene carbonate solution of LiClO$_4$ having a concentration of about 1 mol/l according to the same method as adopted for the conventional type Li$_x$WO$_2$ counter electrode. Of course, the sintered material may be used without injection of Li ions.

As the liquid electrolyte for the electrochromic display element of the present invention having such sintered material assembled therein, there may ordinarily be used a solution of a lithium salt in an organic solvent as in the conventional technique. As a typical instance, there can be mentioned a propylene carbonate solution of LiClO$_4$ having a concentration of 1 mol/l.

In the electrochromic display element of the present invention, the structural requirements other than those mentioned above, especially those of the counter electrode, are not different from the structural requirements of the known conventional techniques and these known requirements may directly be used in the present invention.

DESCRIPTION OF THE PRESENTLY PREFERRED EMBODIMENTS

A comparative display element having the conventional structure, which is mentioned in Examples given hereinafter, will now be described with reference to the sectional view of FIG. 1.

An electrochromic material 3 (having a thickness of 3000 Å) comprised of WO$_3$ is locally deposited on a transparent conductive layer 2 (having a thickness of 3000 Å) of In$_2$O$_3$-SnO$_2$ on a front glass substrate 1 to form a display electrode, and the portion other than the electrochromic material 3 is covered with a passivation film 4 of SiO having a thickness of 3000 Å. A tungsten oxide film is formed on a conductor 9 of In$_2$O$_3$-SnO$_2$ deposited on a back glass substrate 7 and prior to formation of a cell, Li ions are injected in this tungsten oxide film in a liquid electrolyte of LiClO$_4$ having a concentration of 1 mol/l to form a counter electrode 6 of Li$_x$-WO$_3$. This counter electrode 6 is located to confront the above-mentioned electrochromic material 3 and passivation film 4 through an intermediate liquid electrolyte 5 comprised of a propylene carbonate solution of LiClO$_4$ having a concentration of 1 mol/l. The thickness of the portion of the liquid electrolyte 5 is 0.5 mm. Incidentally, a white powder of titanium oxide or the like is incorporated as the reflecting material in the liquid electrolyte 5. A gasket 10 is disposed to prevent flow-out of the liquid electrolyte 5, and the gasket 10 is formed of an epoxy resin. FIG. 1 is a partial sectional view in which the right half of the element is not illustrated. Actually, an end portion similar to the left end portion in FIG. 1 is present on the right side, and a similar gasket 10 is disposed on the right side symmetrically with the gasket 10 located on the left side.

The display element of the present invention, illustrated in each of Examples given hereinafter, is different from the conventional display element having the above-mentioned structure only in the counter electrode. This counter electrode according to the present invention will now be described with reference to FIG. 2.

A filmy sintered material 8 constituting the characteristic feature of the present invention is formed on a conductive layer 11 which is formed on a back glass substrate 7 to provide an electric conduction to the outside, and the sintered material 8 is disposed to confront an electrochromic material (3 in FIG. 1) through an intermediate liquid electrolyte comprised of a propylene carbonate solution of LiClO$_4$ having a concentration of 1 mol/l. The structures and materials of other portions and other conditions of the electrochromic display element in each of Examples are the same as in the above-mentioned comparative element. Prior to formation of a cell, Li ions are injected into the sintered material 8 in a liquid electrolyte comprised of a propylene carbonate solution of LiClO$_4$ having a concentration of 1 mol/l in the same manner as in case of the comparative element.

EXAMPLE 1

In this Example, a sintered material described below is used in the above-mentioned structure of the electrochromic display element according to the present invention.

In this Example, a sintered material formed by mixing a powder of a tin complex with fine particles of carbon, atomizing the mixture and sintering the atomized material is used as the counter electrode. In this counter electrode, variation of the electrode potential by oxidation-reduction on the electrode is much more reduced than in the conventional Li$_x$WO$_3$ electrode, and non-uniform brightness can practically be eliminated. It is believed that this is due to the fact that oxidation-reduction reaction between divalent tin and tetravalent tin is caused on the counter electrode.

The sintered material of the counter electrode in this Example is prepared according to the following procedures.

A transparent conductive film 11 comprised of In$_2$O$_3$ and SnO$_2$ and having a seat resistance of 10 Ω/cm$^2$ is formed on a back glass substrate 7 as a conductor for providing an electric conduction to the outside.

Separately, an aqueous solution of stannic chloride is mixed with an aqueous solution of potassium ferrocyanide at a volume ratio of 1/1 to form a powder of a water-insoluble tin complex. Each solution has a concentration of 1 mol/l. The so obtained powder of the water-insoluble tin complex is mixed with an aqueous solution of colloidal carbon having a carbon concentration of 20% by weight so that the weight ratio of the complex to carbon is ½, and the mixture is atomized. The atomized material is coated on the transparent conductive film 11 on the back glass substrate 7 and is then sintered at 200° C. in open air for 30 minutes to form a sintered material 8 having a thickness of about 50 μm. The thickness of the conductive film 11 is adjusted to 3000 Å.

Figure 2:
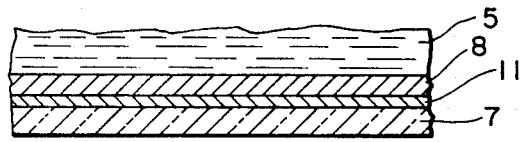
FIG. 2 is a sectional view illustrating the counter electrode portion of an electrochromic display element according to one embodiment of the present invention.

An electrochromic display element comprising a counter electrode comprised of the so obtained sintered material, which is arranged as shown in FIG. 2, is characterized in that the variation of the potential of the counter electrode by writing and erasing on the display electrode is less than 1/10 of the potential variation in the above-mentioned comparative conventional display element. Furthermore, this display element is improved in the point where no substantial non-uniform brightness is caused.

The water-insoluble complex synthesized from stannic chloride (SnCl$_4$) and potassium ferrocyanide (K$_4$[Fe(CN)$_6$]) is a compound represented by the following formula:

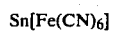

Sn[Fe(CN)$_6$]

On the counter electrode, this compound readily causes the following reversible reaction:

$$Sn[Fe(CN)_6] + 2Li^+ + 2e^- \rightleftharpoons SnLi_2[Fe(CN)_6]$$

It is believed that the variation of the potential of the counter electrode by writing and erasing is diminished by this reversible reaction.

In this Example, the tin complex synthesized from stannic chloride and potassium ferrocyanide is used. An excellent effect similar to the effect obtained in this Example can be obtained when a tin complex synthesized from stannous chloride and potassium ferrocyanide or potassium ferrocyanide is used.

EXAMPLE 2

In this Example, a sintered material formed by mixing a powder of a water-insoluble manganese complex with fine particles of carbon, atomizing the mixture and sintering the atomized material is used as the counter electrode in the above-mentioned electrochromic display device. In this counter electrode, variation of the electrode potential by oxidation-reduction on the electrode is much more reduced than in the conventional $Li_x$-$WO_3$ electrode, and non-uniform brightness can practically be eliminated. It is believed that this is due to the fact that oxidation-reduction reaction between divalent tin and trivalent or tetravalent tin is caused on the counter electrode.

The sintered material of the counter electrode in this Example is prepared according to the following procedures.

Referring to FIG. 2, a transparent conductive film 11 comprised of $In_2O_3$ and $SnO_2$ and having a seat resistance of 10 $\Omega/cm^2$ is formed on a back glass substrate 7 as a conductor for providing an electric conduction to the outside.

Separately, an aqueous solution of manganous chloride is mixed with an aqueous solution of potassium ferricyanide at a volume ratio of 1/1 to form a powder of a water-insoluble manganese complex. Each solution has a concentration of 1 mol/l. The so obtained powder of the water-insoluble manganese complex is mixed with an aqueous solution of colloidal carbon having a carbon concentration of 20% by weight so that the weight ratio of the complex to carbon is ½, and the mixture is atomized. The atomized material is coated on the transparent conductive film 11 on the back glass substrate 7 and is then sintered at 200° C. in open air for about 30 minutes to form a sintered material having a thickness of about 50 μm. The thickness of the conductive film 11 is adjusted to 3000 Å.

An electrochromic display element comprising a counter electrode comprised of the so obtained sintered material, which is arranged as shown in FIG. 2, is characterized in that the variation of the potential of the counter electrode by writing and erasing on the display electrode is less than 1/10 of the potential variation in the above-mentioned comparative conventional display element. Furthermore, this display element is improved in the point where no substantial non-uniform brightness is caused.

The water-insoluble complex synthesized from manganous chloride and potassium ferricyanide is a compound represented by the following formula:

$$MnK[Fe(CN)_6]$$

On the counter electrode, after exchange of K with Li, this compound readily causes the following reversible reaction:—

$$MnLi[Fe(CN)_6] \rightleftharpoons Mn[Fe(CN)_6] + Li^+ + e^-$$

It is believed that the variation of the potential of the counter electrode by writing and erasing is diminished by this reversible reaction.

In this Example, the manganese complex synthesized from manganous chloride and potassium ferricyanide is used. An excellent effect similar to the effect obtained in this Example can be obtained when a manganese complex synthesized from manganic chloride and potassium ferrocyanide or potassium ferricyanide is used.

EXAMPLE 3

In this Example, a sintered material formed by mixing a powder of a nickel complex with fine particles of carbon, atomizing the mixture and sintering the atomized material is used as the counter electrode of the above-mentioned electrochromic display element.

The sintered material of the counter electrode in this Example is prepared according to the following procedures.

Referring to FIG. 2, a transparent conductive film 11 comprised of $In_2O_3$ and $SnO_2$ and having a seat resistance of 10 $\Omega/cm^2$ is formed on a back glass substrate 7 as a conductor for providing an electric conduction to the outside.

Separately, an aqueous solution of nickel sulfate having a concentration of 1 mol/l is mixed with an aqueous solution of potassium ferricyanide having a concentration of 1 mol/l at a volume ratio of 1/1 to form a powder of a water-insoluble nickel complex. The so obtained powder of the water-insoluble nickel complex is mixed with an aqueous solution of colloidal carbon having a carbon concentration of 20% by weight and an aqueous solution of PVA having a concentration of 5% so that the complex/carbon/PVA weight ratio is 1/2/0.01, and the mixture is atomized. The atomized material is coated on the transparent conductive film 11 on the back glass substrate 7 according to the printing technique and is then sintered at 200° C. in open air for about 30 minutes to form a sintered material having a thickness of about 100 μm. The thickness of the conductive film 11 is adjusted to 3000 Å.

An electrochromic display element comprising a counter electrode comprised of the so obtained sintered material, which is arranged to confront the electrochromic material as shown in FIG. 2, is characterized in that the variation of the potential of the counter electrode by writing and erasing on the display electrode is less than 1/10 of the potential variation in the above-mentioned comparative conventional display element. Furthermore, this display element is improved in the point where no substantial non-uniform brightness is caused.

The water-insoluble nickel complex synthesized by the above procedures is a compound represented by the following formula:

$$NiK[Fe(CN)_6]$$

On the counter electrode, after exchange of K with Li, this compound readily causes the following reversible reaction:

$$2Ni^{II}Li[Fe^{III}(CN)_6] \rightleftharpoons Ni^{II}Ni^{IV}[Fe^{III}(CN)_6]_2 + 2Li^+ + 2e^-$$

It is believed that the variation of the potential of the counter electrode by writing and erasing is diminished by this reversible reaction.

In this Example, the nickel complex synthesized from nickel sulfate (NiSO$_4$) and potassium ferricyanide is used. An excellent effect similar to the effect obtained in this Example can be obtained when a nickel complex synthesized by using a divalent nickel salt such as nickel chloride instead of nickel sulfate is used.

EXAMPLE 4

In this Example, a sintered material formed by mixing a powder of a water-insoluble iron salt synthesized from an aqueous solution of a water-soluble tungstate and an aqueous solution of a water-soluble iron salt with fine particles of carbon, atomizing the mixture and sintering the atomized material is used as the counter electrode.

The sintered material of the counter electrode in this Example is prepared according to the following procedures.

Referring to FIG. 2, a transparent conductive film 11 comprised of In$_2$O$_3$ and SnO$_2$ and having a seat resistance of 10 $\Omega$/cm$^2$ is formed on a back glass substrate 7 as a conductor for providing an electric conduction to the outside.

Separately, an aqueous solution of sodium tungstate (Na$_2$WO$_3$) is mixed with an aqueous solution of ferric chloride (FeCl$_3$) at a volume ratio of 1/1 to form a powder of a water-insoluble iron salt. Each solution has a concentration of 1 mol/l. The so obtained powder of the water-insoluble iron salt is mixed with an aqueous solution of colloidal carbon having a carbon concentration of 20% by weight and a binder comprised of a 2% aqueous solution of PVA so that the iron/carbon/PVA weight ratio is 1/2/0.005, and the mixture is atomized. The atomized material is coated on the transparent conductive film 11 on the back glass substrate 7 by the printing technique and is then sintered at 200° C. in open air for about 30 minutes to form a sintered material 8 having a thickness of about 100 μm. The thickness of the conductive film 11 is adjusted to 3000 Å.

An electrochromic display element comprising a counter electrode comprised of the so obtained sintered material, which is arranged to confront the electrochromic material as shown in FIG. 2, is characterized in that the variation of the potential of the counter electrode by writing and erasing on the display electrode is less than 1/10 of the potential variation in the above-mentioned comparative conventional display element. Furthermore, this display element is improved in the point where no substantial non-uniform brightness is caused.

The water-insoluble iron salt synthesized in this Example is a compound represented by the following formula:

Fe$_2$(WO$_4$)$_3$

On the counter electrode, this compound readily causes the following reversible reaction:

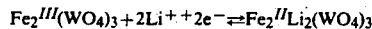
Fe$_2^{III}$(WO$_4$)$_3$ + 2Li$^+$ + 2e$^-$ ⇌ Fe$_2^{II}$Li$_2$(WO$_4$)$_3$ It is believed that the variation of the potential of the counter electrode by writing and erasing is diminished by this reversible reaction.

In this Example, the water-insoluble iron salt synthesized from sodium tungstate (Na$_2$WO$_4$) and ferric chloride (FeCl$_3$) is used. An excellent effect similar to the effect obtained in this Example can be obtained when a water-insoluble iron salt synthesized from other water-soluble iron salt such as ferrous chloride, ferrous sulfate, ferric nitrate or ferrous nitrate and other water-soluble tungstate such as potassium tungstate is used.

EXAMPLE 5

In this Example, a sintered material formed by mixing a powder of a water-insoluble manganese salt synthesized from an aqueous solution of a water-soluble tungstate and an aqueous solution of a water-soluble manganese salt with fine particles of carbon, atomizing the mixture and sintering the atomized material is used as the counter electrode.

The sintered material of the counter electrode in this Example is prepared according to the following procedures.

Referring to FIG. 2, a transparent conductive film 11 comprised of In$_2$O$_3$ and SnO$_2$ and having a seat resistance of 10 $\Omega$/cm$^2$ is formed on a back glass substrate 7 as a conductor for providing an electric conduction to the outside.

Separately, an aqueous solution of sodium tungstate (Na$_2$WO$_4$) is mixed with an aqueous solution of manganese sulfate (MnSO$_4$) at a volume ratio of 1/1 to form a powder of a water-insoluble manganese salt. Each solution has a concentration of 1 mol/l. The so obtained powder of the water-insoluble manganese salt is mixed with an aqueous solution of colloidal carbon having a carbon concentration of 20% by weight so that the weight ratio of the manganese salt to carbon is ½, and the mixture is atomized. The atomized material is coated on the transparent conductive film 11 on the back glass substrate 7 by the printing technique and is then sintered at 200° C. in open air for 30 minutes to form a sintered material 8 having a thickness of about 100 μm. The thickness of the conductive film 11 is adjusted to 3000 Å.

An electrochromic display element comprising a counter electrode comprised of the so obtained sintered material, which is arranged to confront the electrochromic material as shown in FIG. 2, is characterized in that the variation of the potential of the counter electrode by writing and erasing on the display electrode is less than 1/10 of the potential variation in the above-mentioned comparative conventional display element. Furthermore, this display element is improved in the point where no substantial non-uniform brightness is caused.

The water-insoluble manganese salt synthesized in this Example is a compound represented by the formula Mn$^{II}$WO$_4$ or a compound of the formula Mn$_2^{III}$(WO$_4$)$_3$ formed by oxidation of divalent manganese during synthesis. On the counter electrode, this compound readily causes the following reversible reaction:

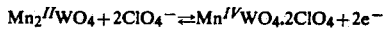
Mn$_2^{II}$WO$_4$ + 2ClO$_4^-$ ⇌ Mn$^{IV}$WO$_4$.2ClO$_4$ + 2e$^-$ or

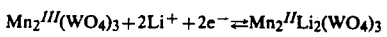
Mn$_2^{III}$(WO$_4$)$_3$ + 2Li$^+$ + 2e$^-$ ⇌ Mn$_2^{II}$Li$_2$(WO$_4$)$_3$ It is believed that the variation of the potential of the counter electrode by writing and erasing is diminished by this reversible reaction.

In this Example, the water-insoluble manganese salt synthesized from sodium tungstate (Na$_2$WO$_4$) and manganese sulfate (MnSO$_4$) is used. An excellent effect similar to the effect obtained in this Example can be obtained when there is used a water-insoluble manganese salt synthesized from other water-soluble tungstate such as sodium tungstate and other water-soluble manganese salt such as manganese chloride ($MnCl_2$).

EXAMPLE 6

An electrochromic display element is prepared in the same manner as in Example 4 except that Carbon Paste (trademark for a mixture of carbon and a binder supplied by Tokuriki Kagaku Kenkyusho, Japan) and a water-insoluble iron salt powder are used and a small amount of ethyl acetate or methyl acetate is added. The characteristics of the element are substantially the same as those of the element obtained in Example 4.

The Carbon Paste used is a mixture comprising 70% by weight of carbon powder and 30% by weight of a one-component type epoxy binder. The seat resistance of the sintered material is 10 $\Omega/cm^2$.

A water-insoluble iron salt prepared in the same manner as described in Example 4 is dried at 200° C. for 30 minutes and is then mixed with the Carbon Paste at an iron salt/carbon weight ratio of 2/1, and an appropriate amount of ethyl acetate or methyl acetate is added so as to facilitate the atomizing operation. The mixture is atomized and the atomized material is coated on the transparent conductive film 11 on the back glass substrate 7 by the printing technique, dried at room temperature for 10 to 30 minutes and sintered at 200° C. in open air for about 30 minutes. Other conditions for the production of an electrochromatic display element are the same as those adopted in Example 4.

An electrochromic display element comprising a counter electrode comprised of the so obtained sintered material, which is arranged as shown in FIG. 2, is characterized in that the variation of the potential of the counter electrode by writing and erasing on the display electrode is less than 1/10 of the potential variation in the above-mentioned comparative conventional display element. Furthermore, this display element is improved in the point where no substantial non-uniform brightness is caused.

As will readily be understood from the foregoing description and the results obtained in the foregoing Examples, in an electrochromic display element comprising the counter electrode of the present invention, the fatal defect of the conventional electrochromatic element, that is, non-uniform brightness, is eliminated, and this effect is very prominent.

Obviously many modifications and variations of the present invention are possible in the light of the above teachings. It is therefore to be understood that within the scope of the appended claims the invention may be practised otherwise than as specifically described.

What is claimed is:

1. An electrochromic display element comprising a display electrode, a counter electrode and a liquid electrolyte disposed intermediately between said display electrode and said counter electrode, wherein the counter electrode is comprised of a sintered material formed by sintering an atomized material comprising a powder of carbon and a powder of one compound selected from the group consisting of $Sn(Fe(CN)_6)$, $MnK(Fe(CN)_6)$, $NiK(Fe(CN)_6)$, amorphous $Fe_2(WO_4)_x$, where $2.5 < x \leq 3.0$, amorphous $FeWO_4$, amorphous $Mn_2(WO_4)_3$ and amorphous $MnWO_4$.

2. An electrochromic display element as set forth in claim 1, wherein the atomized material further comprises a binder.

3. An electrochromic display element as set forth in claim 1, wherein the thickness of the sintered material is 5 to 1000 μm.

4. An electrochromic display element as set forth in claim 1, wherein the thickness of the sintered material is 50 to 100 μm.

5. An electrochromic display element as set forth in claim 1, wherein the atomized material is coated on a conductive film on a back substrate and sintered.

6. An electrochromic display element as set forth in any of claims 1 through 5, wherein said compound is a member selected from the group consisting of amorphous $Fe_2(WO_4)_x$ and amorphous $FeWO_4$, where $2.5 < x \leq 3$.

7. An electrochromic display element as set forth in claim 6, wherein said compound is iron tungstate synthesized by mixing an aqueous solution of a water-soluble tungstate with an aqueous solution of a water-soluble iron salt.

8. An electrochromic display element as set forth in claim 7, wherein said water-soluble tungstate is a member selected from the group consisting of potassium tungstate and sodium tungstate and said water-soluble iron salt is a member selected from the group consisting of ferrous chloride, ferric chloride, ferrous sulfate, ferrous nitrate and ferric nitrate.

9. An electrochromic display element as set forth in any of claims 1 through 5, wherein said compound is a member selected from the group consisting of amorphous $Mn_2(WO_4)_3$ and amorphous $MnWO_4$.

10. An electrochromic display element as set forth in claim 9, wherein said compound is manganese tungstate synthesized by mixing an aqueous solution of a water-soluble tungstate with an aqueous solution of a water-soluble manganese salt.

11. An electrochromic display element as set forth in claim 10, wherein said water-soluble tungstate is a member selected from the group consisting of potassium tungstate and sodium tungstate and said water-soluble manganese salt is a member selected from the group consisting of manganese sulfate and manganese chloride.

12. An electrochromic display element as set forth in any of claims 1 through 5, wherein said compound is $Sn(Fe(CN)_6)$.

13. An electrochromic display element as set forth in claim 12, wherein said compound is $Sn(Fe(CN)_6)$ synthesized by mixing an aqueous solution of a member selected from the group consisting of potassium ferricyanide and potassium ferrocyanide with an aqueous solution of stannous chloride.

14. An electrochromic display element as set forth in claim 12, wherein said compound is $Sn(Fe(CN)_6)$ synthesized by mixing an aqueous solution of potassium ferrocyanide with an aqueous solution of stannic chloride.

15. An electrochromic display element as set forth in any of claims 1 through 5, wherein said compound is $MnK(Fe(CN)_6)$.

16. An electrochromic display element as set forth in claim 15, wherein said compound is $MnK(Fe(CN)_6)$ synthesized by mixing an aqueous solution of a member selected from the group consisting of potassium ferricyanide and potassium ferrocyanide with an aqueous solution of manganic chloride.

17. An electrochromic display element as set forth in claim 15, wherein said compound is $MnK(Fe(CN)_6)$ synthesized by mixing an aqueous solution of potassium ferricyanide with an aqueous solution of manganous chloride.

18. An electrochromic display element as set forth in any of claims 1 through 5, wherein said compound is $NiK(Fe(CN)_6)$.

19. An electrochromic display element as set forth in claim 18, wherein said compound is $NiK(Fe(CN)_6)$ synthesized by mixing an aqueous solution of a member selected from the group consisting of nickel sulfate and nickel chloride with an aqueous solution of potassium ferricyanide.

20. An electrochromic display element as set forth in any of claims 1 through 5, wherein said one compound is a water-insoluble compound.

21. An electrochromic display element as set forth in claim 1, wherein the weight ratio of said one compound to carbon is 1:20 to 1:0.3.

22. An electrochromic display element as set forth in claim 2, wherein said binder is included in an amount of from 0.5-1.0% based on the weight of said one compound.

23. An electrochromic display element as set forth in claim 1, wherein said liquid electrolyte is a lithium salt in an organic solvent.

24. An electrochromic display element as set forth in claim 23, wherein said lithium salt is $LiClO_4$, and said organic solvent is propylene carbonate, the solution having a concentration 1 mol/l.

* * * * *